(12) United States Patent
Manser et al.

(10) Patent No.: US 9,565,967 B2
(45) Date of Patent: Feb. 14, 2017

(54) PORTIONED SYSTEM FOR PREPARING A NUTRITIONAL PRODUCT

(75) Inventors: Daniel Roland Manser, Spiez (CH); Yann Epars, Penthalaz (CH); Heinz Wyss, Oberdiessbach (CH); Frederic Doleac, Vaux et Chantegrue (FR); Nicolas Jean-Guy Bezet, Macon (FR); Lucio Scorrano, Yverdon-les-Bains (CH); Silvio Lardelli, St Gallen (CH); Marco Ramaioli, Pully (CH)

(73) Assignee: Nestec S.A., Vevey (CH)

(*) Notice: Subject to any disclaimer, the term of this patent is extended or adjusted under 35 U.S.C. 154(b) by 892 days.

(21) Appl. No.: 13/500,782

(22) PCT Filed: Oct. 7, 2010

(86) PCT No.: PCT/EP2010/064984
§ 371 (c)(1),
(2), (4) Date: Apr. 6, 2012

(87) PCT Pub. No.: WO2011/042489
PCT Pub. Date: Apr. 14, 2011

(65) Prior Publication Data
US 2012/0199227 A1    Aug. 9, 2012

(30) Foreign Application Priority Data

Oct. 8, 2009   (EP) .................................... 09172602

(51) Int. Cl.
*A47J 31/06* (2006.01)
*B01D 35/02* (2006.01)
*B65D 85/804* (2006.01)

(52) U.S. Cl.
CPC ........ *A47J 31/0673* (2013.01); *B65D 85/8043* (2013.01); *Y10T 137/87571* (2015.04)

(58) Field of Classification Search
CPC .................... A47J 31/0673; Y10T 137/87571; B65D 85/8043; B01D 35/02
(Continued)

(56) References Cited

U.S. PATENT DOCUMENTS 6,033,455 A *  3/2000  Kurashima ..................... 55/497
6,644,173 B2   11/2003  Lazaris et al.
(Continued)

FOREIGN PATENT DOCUMENTS

EP   1774878    4/2007
EP   2000062    12/2008
(Continued)

OTHER PUBLICATIONS

Search Report for International Application No. PCT/EP2010/064894 mailed Feb. 9, 2011.
(Continued)

*Primary Examiner* — Madeline Gonzalez
(74) *Attorney, Agent, or Firm* — K&L Gates LLP

(57) ABSTRACT

A portioned system for preparing a nutritional liquid product comprising a liquid supply device (2, 41) and a container (4, 38) containing nutritional ingredients; said container having an opening (8), the system further 5 comprising a liquid injection interface (9, 37) for supplying an amount of liquid in the container (4, 38) thereby providing the nutritional liquid product, wherein the liquid injection interface (9, 37) comprises a liquid inlet (11, 43) and a product outlet (16, 48) for removing the nutritional liquid product from the container wherein the liquid injection interface comprises a wall (10) extending 10 transversally relative to the opening of the container during the operation of the system; said transversal wall (10) comprising the liquid inlet (11, 43) and the product outlet (16, 48) which are transversally distant one another along the said wall.

13 Claims, 11 Drawing Sheets

Figure 1:
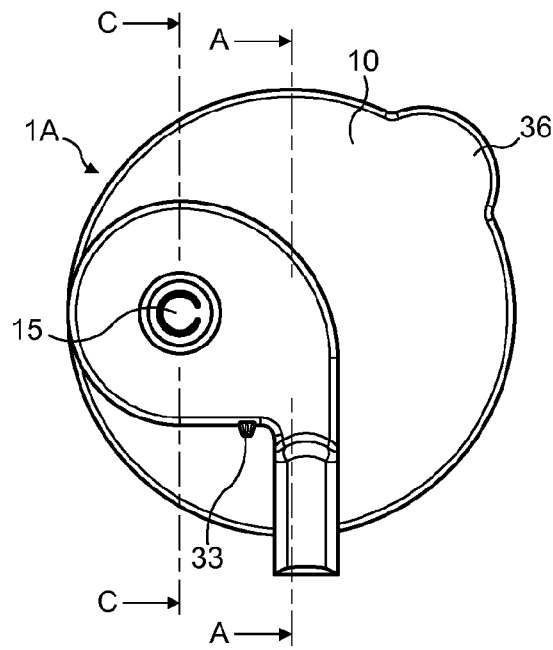

(58) Field of Classification Search
USPC ....... 210/348, 473–475, 477, 481, 464, 450, 210/453, 454; 137/602; 99/295
See application file for complete search history.

(56) References Cited

U.S. PATENT DOCUMENTS

| | | |
|---|---|---|
| 8,087,347 B2 | 1/2012 | Halliday et al. |
| 2005/0034604 A1 | 2/2005 | Halliday et al. |
| 2007/0181005 A1 | 8/2007 | Kirschner et al. |
| 2009/0155422 A1* | 6/2009 | Ozanne .......................... 426/89 |

FOREIGN PATENT DOCUMENTS

| | | |
|---|---|---|
| GB | 1256247 | 12/1971 |
| WO | WO0160220 | 8/2001 |
| WO | WO02081337 | 10/2002 |
| WO | 2004065257 | 8/2004 |
| WO | WO2005077811 | 8/2005 |
| WO | WO2006077259 | 7/2006 |
| WO | WO2008012314 | 1/2008 |
| WO | WO2008130240 | 10/2008 |
| WO | WO2008153383 | 12/2008 |
| WO | 2009092628 | 7/2009 |
| WO | 2009092774 | 7/2009 |
| WO | WO2009092629 | 7/2009 |

OTHER PUBLICATIONS

Written Opinion for International Application No. PCT/US2010/064577 mailed Jan. 17, 2011.

* cited by examiner

PORTIONED SYSTEM FOR PREPARING A NUTRITIONAL PRODUCT

CROSS REFERENCE TO RELATED APPLICATIONS

The present application is a National Stage of International Application No. PCT/EP2010/064984, filed on Oct. 7, 2010, which claims priority to European Patent Application No. 09172602.6, filed on Oct. 8, 2009, the entire contents of which are being incorporated herein by reference.

The present invention relates to a portioned system for preparing a nutritional liquid product from nutritional ingredients arranged in a container by injection of a liquid in the container and mixing said liquid with the ingredients to form the nutritional liquid product.

Portioned systems for preparing a liquid nutritional product such as a formula for infant, toddlers or adults requiring specific feeding have been described in several patent publications. A portioned system enables to deliver a controlled dose to the baby or patient in a more convenient manner than by the typical manual preparation including warming water, dosing the powder and mixing it with warmed water into a vessel (e.g., a baby bottle).

WO 2006077259 relates to a method for preparing nutritional composition by a disposable capsule opened under pressure to drain the product directly in the vessel. The advantage is a more hygienic delivery by avoiding contact with permanent parts of the device.

WO 2008012314 relates to a dispenser for a nutritional composition comprising a bacterial filter between the water heating means and the water discharge means such that, in use, heated water passes through the filter prior to discharge from the dispenser. Therefore, water is treated prior to mixing with the ingredients contained in the disposable container.

WO 2008130240 relates to a device for preparing a ready-to-use liquid product from a semi-finished product, said product arranged in a container, the device comprising an injector for supplying an amount of liquid in the container thereby producing the ready-to-use liquid product, wherein the injector is arranged for evacuating the ready-to-use liquid product from the container into a vessel.

WO 2009/092629 relates to a capsule for use in a beverage production device, the capsule containing ingredients for producing a nutritional liquid when a liquid is fed into the capsule at an inlet face thereof, the capsule being provided with an antimicrobial filter.

There is a need for a portioned system for preparing a nutritional product that is safer from a hygienic and nutritional point of view. In particular, one aspect is to ensure a controlled feeding by improving the emptying of the portioned container with as little liquid or solid residue as possible left in the container. Another aspect is to propose a hygienic system with reduced risks of microbiological issue.

For this, the invention relates to a portioned system for preparing a nutritional liquid product comprising a liquid supply device and a container containing nutritional ingredients; said container having an opening, the system further comprising a liquid injection interface for supplying an amount of liquid in the container thereby providing the nutritional liquid product by mixing said liquid with the ingredients in the container, wherein the liquid injection interface comprises a liquid inlet and a product outlet for removing the nutritional liquid product from the container, wherein the liquid injection interface comprises a wall extending transversally relative to the opening of the container during the operation of the system; said transversal wall comprising the liquid inlet and the product outlet which are transversally distant one another along the said wall.

Therefore, contrary to known devices of the prior art, the present system proposes a solution that is configured for reducing the risk of contact with the device (thereby improving hygiene by reducing risk of contamination). It also improves the evacuation of the nutritional product from the container in order to ensure a safe feeding. The solution also offers the possibility to reduce the size of the container after use, such as, by compressing the container independently from the liquid injection interface.

In certain preferred modes, the liquid injection interface is positioned vertically in the liquid supply device, when said interface is engaged with the container, wherein the product outlet is placed on the injection interface at a distance below the liquid inlet during product dispensing.

In a preferred mode, the product outlet is placed in front of the opening and substantially adjacent the flange like rim of the container. Therefore, the evacuation of the nutritional product is promoted, in particular, when the container is positioned with the liquid injection interface extending along a vertical plane. Preferably, the product outlet comprises at least one through-hole provided in the wall that is placed in front of the opening at a distance of from 0 to 5 mm of the rim of the container.

In other modes, the liquid injection interface is positioned horizontally in the liquid supply device when engaged with the container and below the container so that the product outlet is placed laterally distant from the liquid inlet and is oriented downwards during operation. Again such configuration differs from the previous vertical solutions but also provides reduced risks of cross-contamination and an improved evacuation of the product from the container.

The term "vertical" means strictly vertical or close to vertical by an angle of less than 45 degrees relative to vertical. The term "horizontal" means strictly horizontal or close to horizontal by an angle of less than 45 degrees relative to horizontal.

In a general aspect of the invention, the liquid injection interface comprises an antimicrobial filter. The filter can be placed at the liquid inlet for filtering the liquid supplied into the container. Alternatively, the filter can be placed at the product outlet for removing undesired micro-organisms from the liquid product coming out of the container. In a preferred aspect, the filter has a surface that is at least two times smaller than the transversal surface of the liquid injection interface. The filter may preferably be a thin micro-porous membrane.

In an embodiment, the injection interface comprises a filter-supporting structure formed by several studs and/or ridges protruding from a recessed seat onto which the filter is placed. This structure provides a surface-distributed mechanical support for the filter and therefore it avoids its rupture under the pressure of liquid supplied to the interface.

For further protection of the filter, the filter is covered by an outer cover. The cover can be sealed onto the transversal wall of the interface. The outer can be a rigid plastic member comprising a liquid inlet port. The liquid inlet port can be further sealed by a perforable or peelable foil to ensure the integrity of the filter before use. In order to reduce the number of elements of the interface, the cover may extend transversally to form at least a portion of the product outlet. For instance, the cover forms a half part of a tubular duct that extends substantially parallel to the transversal wall of the interface.

In a first mode, the liquid injection interface is connected to the container in a fixed manner. Preferably, the liquid injection interface is sealed to the flange-like rim of the container. Sealing can be obtained by heat or ultrasonic welding or any other suitable technique. In this case, the container and the interface form together a portioned capsule which can be associated to a liquid supply device for being fed with liquid. The capsule is then disposed after delivery of the nutritional product.

In a preferred vertical orientation of the liquid injection interface during operation of the system of the invention, the evacuation of the liquid product is further promoted by providing the liquid injection interface with a product dispensing duct substantially parallel to the transversal wall of the interface. As a result, when the container is placed with its opening substantially vertical, liquid product is guided in the duct vertically towards the vessel below.

In another mode in which the liquid injection interface is horizontal during operation, the dispensing duct is preferably perpendicular to the transversal wall of the interface.

In another mode of the invention, the liquid injection interface has at least one inlet perforation means for opening at least one liquid orifice in the container when engaged with the container. The liquid injection interface has also at least one outlet perforation means for opening at least one product dispensing orifice in the container when engaged with the container. The perforation means can be formed of sharp edges such as needles or blades. The container may have a perforable membrane which closes the opening of the container and which is perforated by the liquid injection interface when it engages the container. In general, the container can be made of oxygen-barrier material to ensure a longer shelf life of the ingredients.

In a mode, the liquid injection interface is a separable and disposable part placed between the container and the liquid supply device. The liquid injection interface can thereby be disposed as often as the container or may be used with several containers before being disposed.

In another mode, the liquid injection interface is (e.g., slidably) connected to the container and moveable between a first position into which the container is not perforated and a second position into which the container is perforated by the said perforation means. Therefore, the container and the liquid injection interface form a single-use capsule. The capsule is opened only at the time of use by any suitable means such as by means of mechanical and/or fluid pressure.

The invention also relates to a capsule for preparing a nutritional liquid product from nutritional ingredients comprising a container having an opening wherein the capsule comprises a liquid injection interface for supplying an amount of liquid in the container thereby providing the nutritional liquid product wherein the liquid injection interface comprises a liquid inlet and a product outlet for removing the nutritional liquid product from the container. In particular, the liquid injection interface comprises a transversal wall for closing the opening of the container; said transversal wall comprising the liquid inlet and the product outlet which are transversally distant one another along the said wall.

The container has preferably compressible walls which are more flexible than the transversal wall of said liquid injection interface. For example, the container has thinner walls and/or walls made of more flexible material. The container is preferably cup-shaped with a bottom wall which is more rigid that the lateral sidewall.

The invention relates also to a series of capsules for preparing a nutritional liquid product from nutritional ingredients comprising containers having a bottom wall, a sidewall and an opening, said containers containing a specific amount of nutritional ingredients, wherein each capsule comprises a liquid injection interface arranged transversally for closing the opening of the container; said liquid injection interface comprising at least liquid inlet for supplying an amount of liquid in the container, wherein the containers are of progressively increased sizes in the series and the liquid injection interface is the same for all the different containers.

In another aspect, the invention relates to a device for supplying liquid into a container containing a nutritional or beverage ingredients, said device comprising a liquid distributor for supplying liquid at an injection side of the container and means for compressing the container to reduce the size of the container after and/or during liquid distribution; said compressing means are configured to compress the container in the direction from its bottom side towards its injection side.

It should be noted that the device can be used for preparing different kinds of beverages (e.g., coffee, milk, soup etc.) or specialized nutritional products (e.g., infant formula, baby food, performance nutritional products, etc.).

In particular, the compressing means are configured to adjust to different sizes of containers.

In particular, the device comprises a piston which moves relatively to the container to compress the container. The device can comprise a hollow part for receiving the moveable piston and into which can also be lodged a container size adjusting shell. The piston means may further be activated (e.g., by pushing the container's bottom forwards) to eject the container from the compressing means, e.g., from the said size adjusting shell.

The present invention will be further described in the following detailed description.

Figure 2:
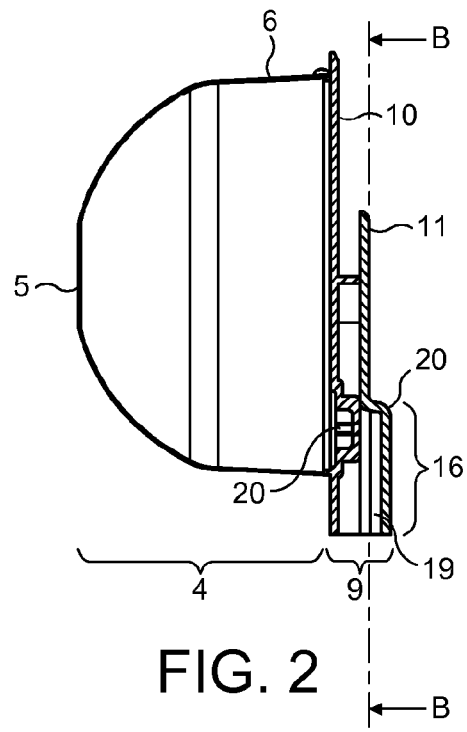
Figure 3:
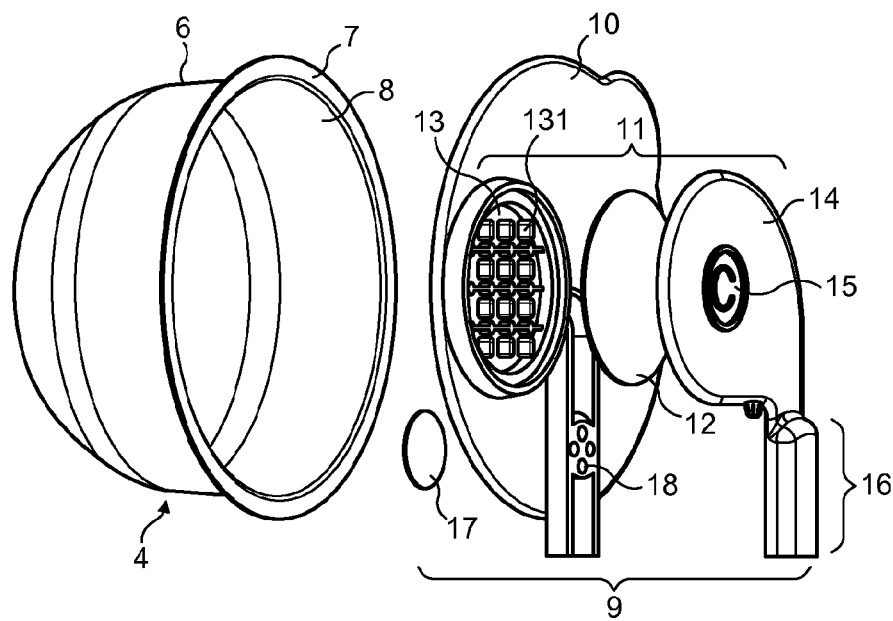
Figure 4:
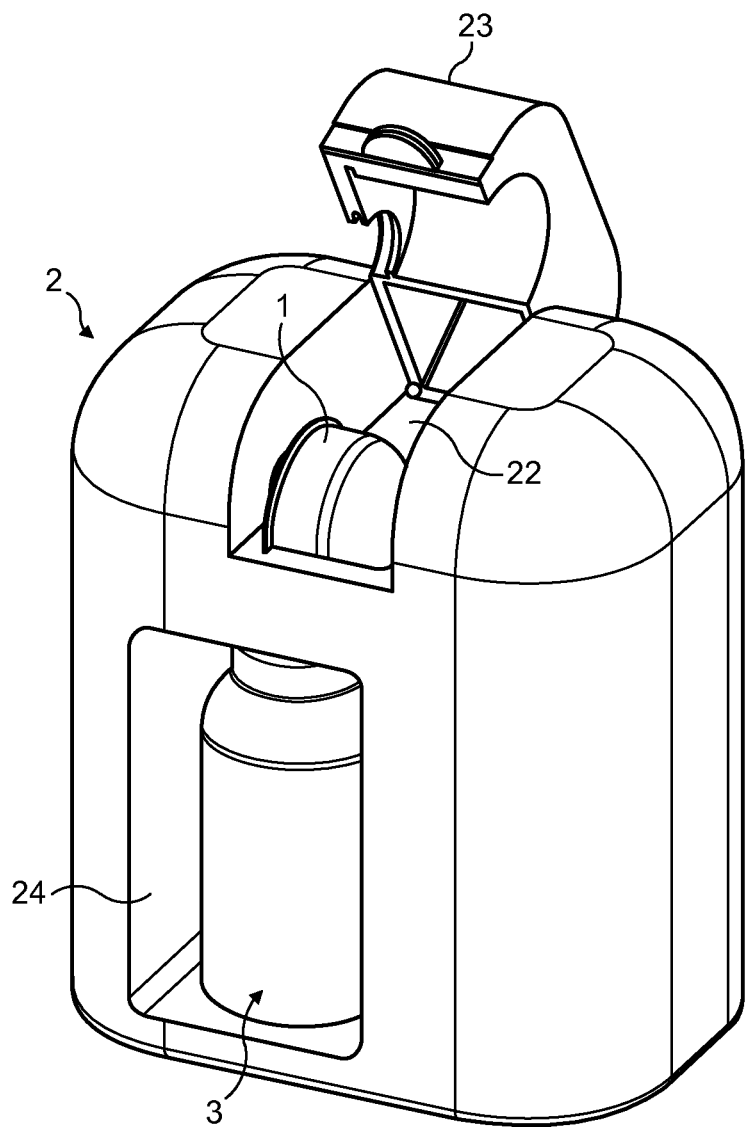
Figure 5:
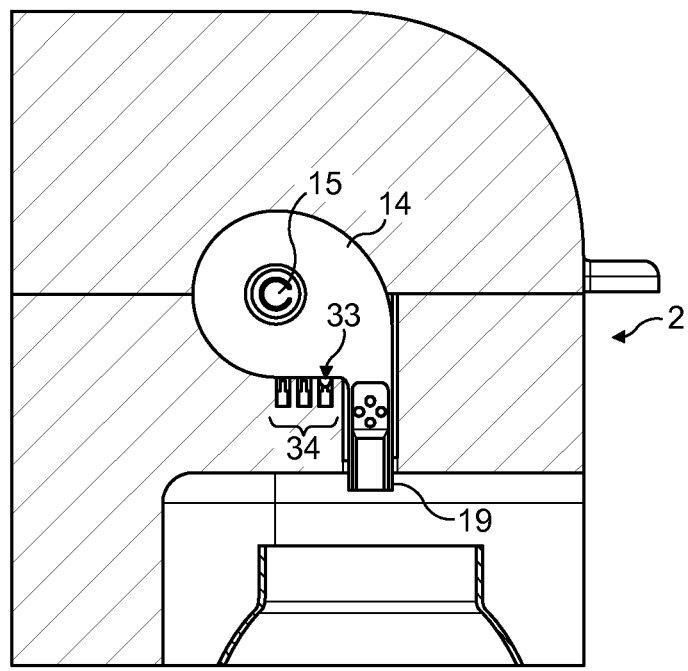
Figure 6:
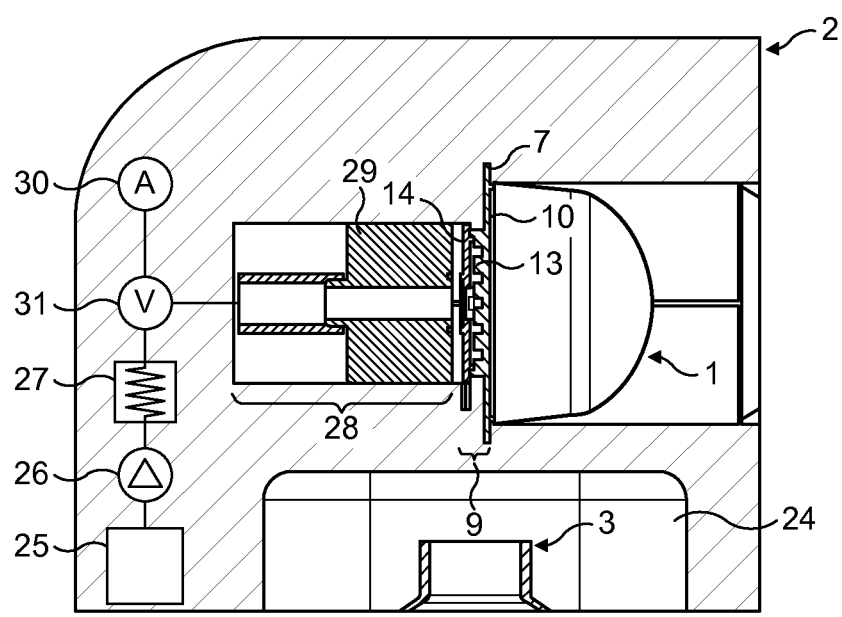
Figure 7:
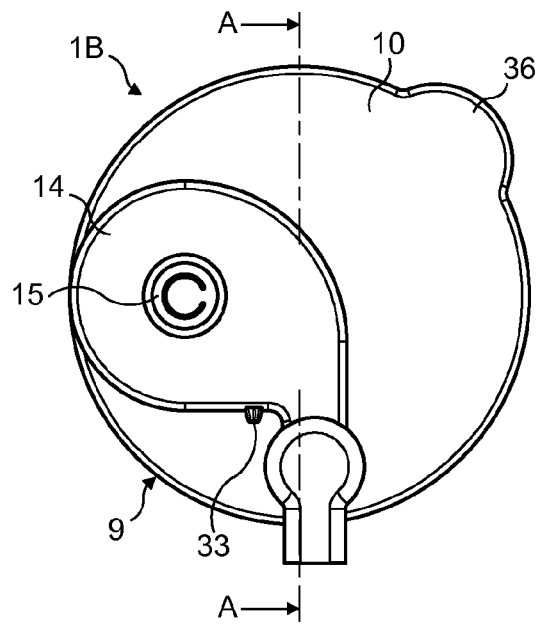
Figure 8:
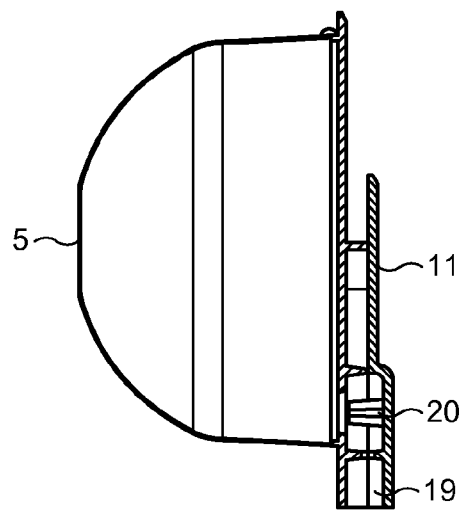
Figure 9:
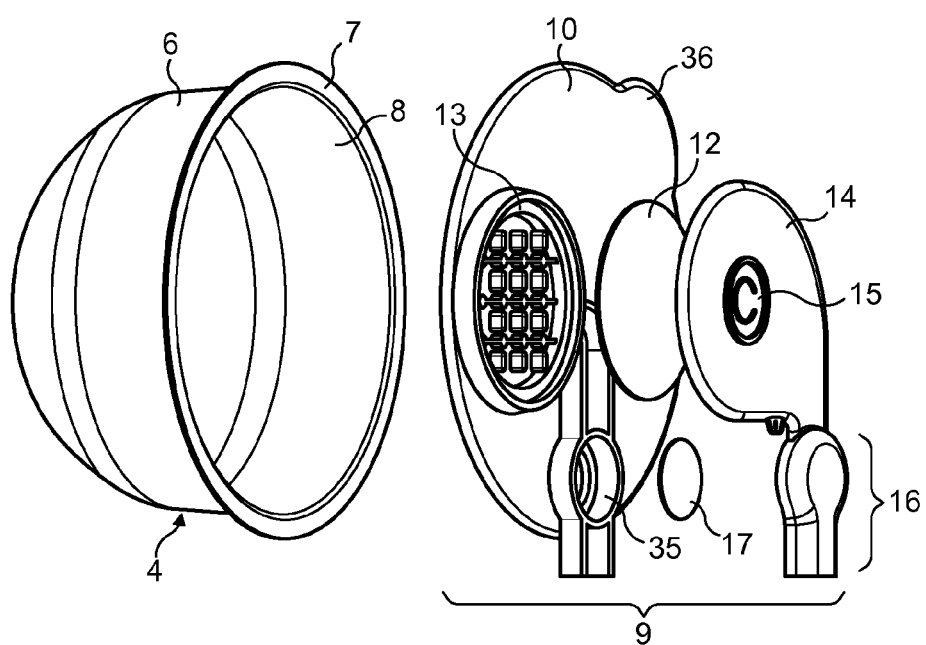
Figure 10:
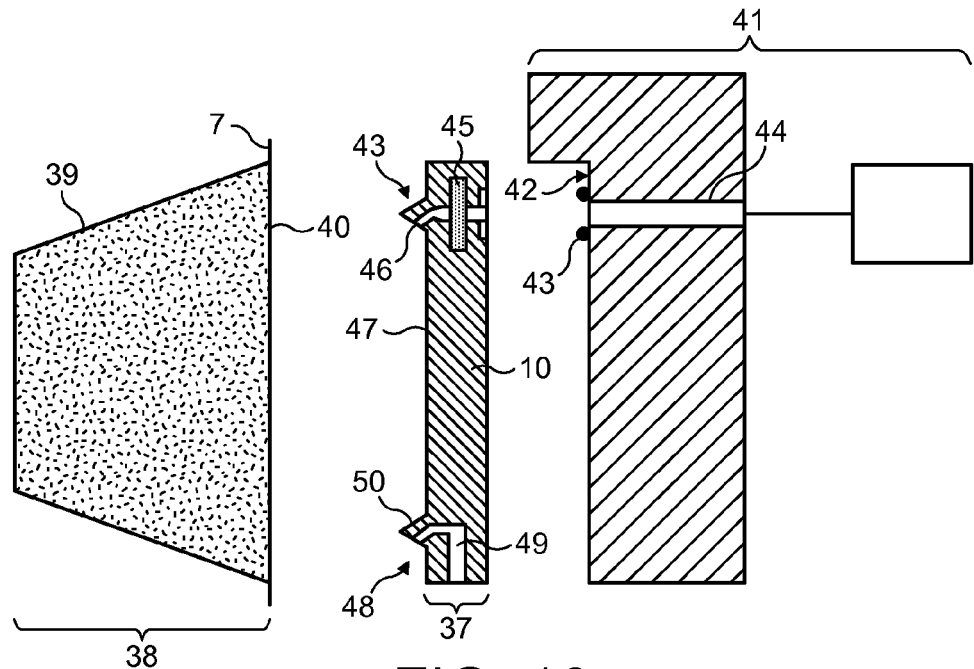
Figure 11:
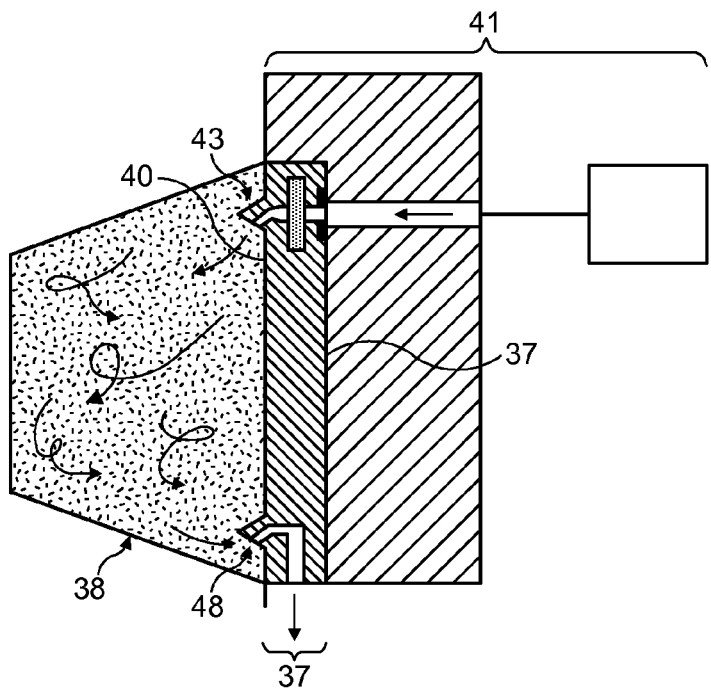
Figure 12:
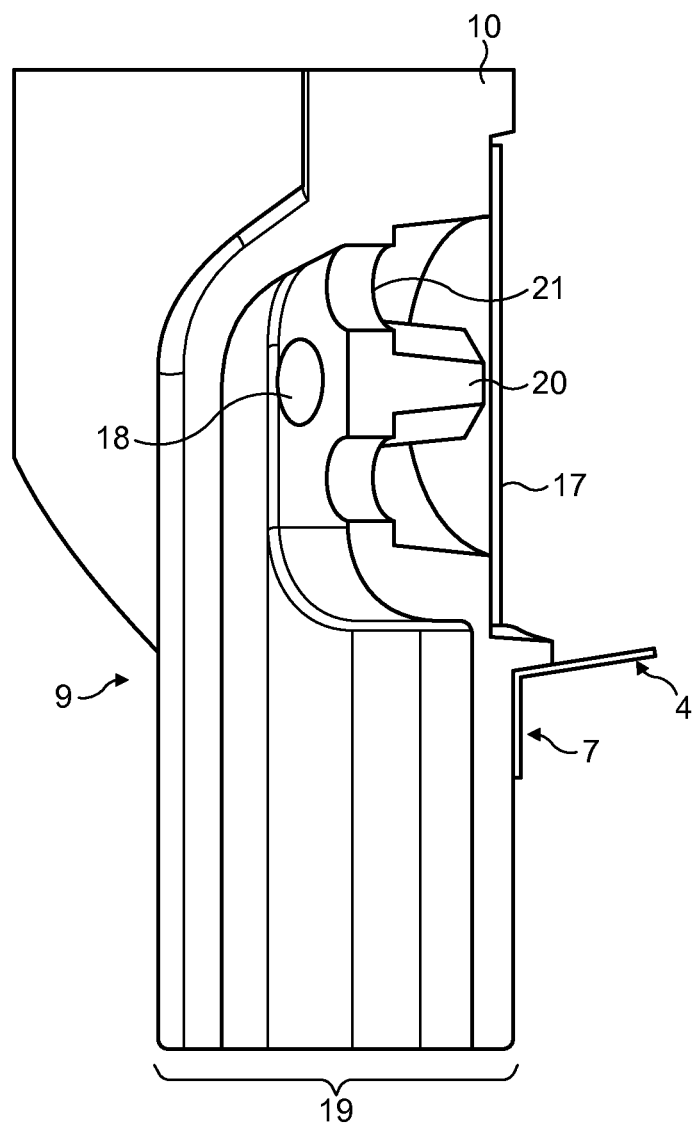
Figure 13:
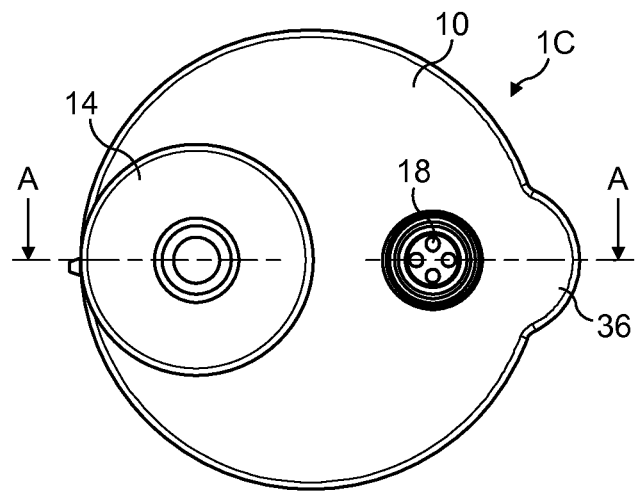
Figure 14:
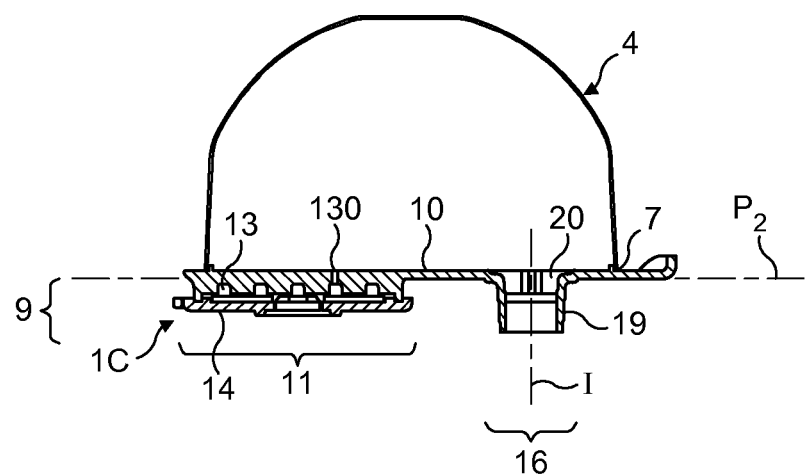
Figure 15:
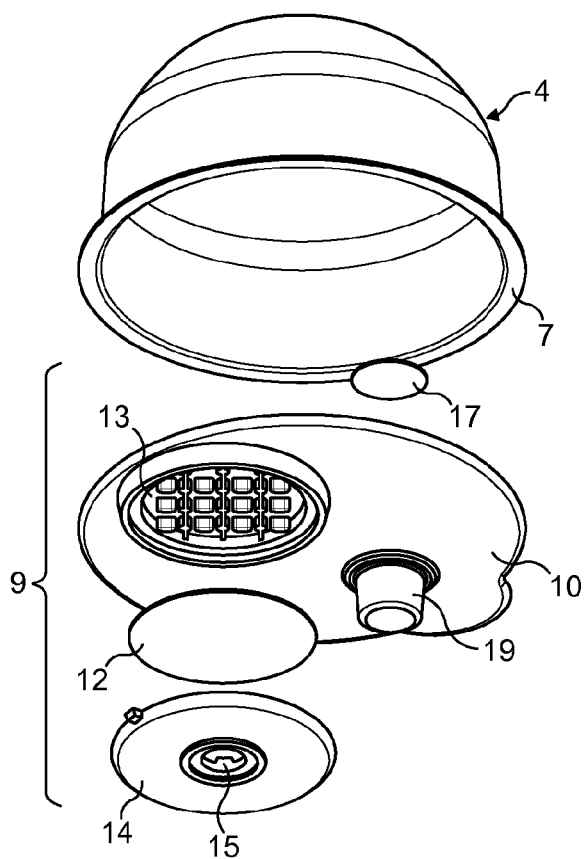
Figure 16:
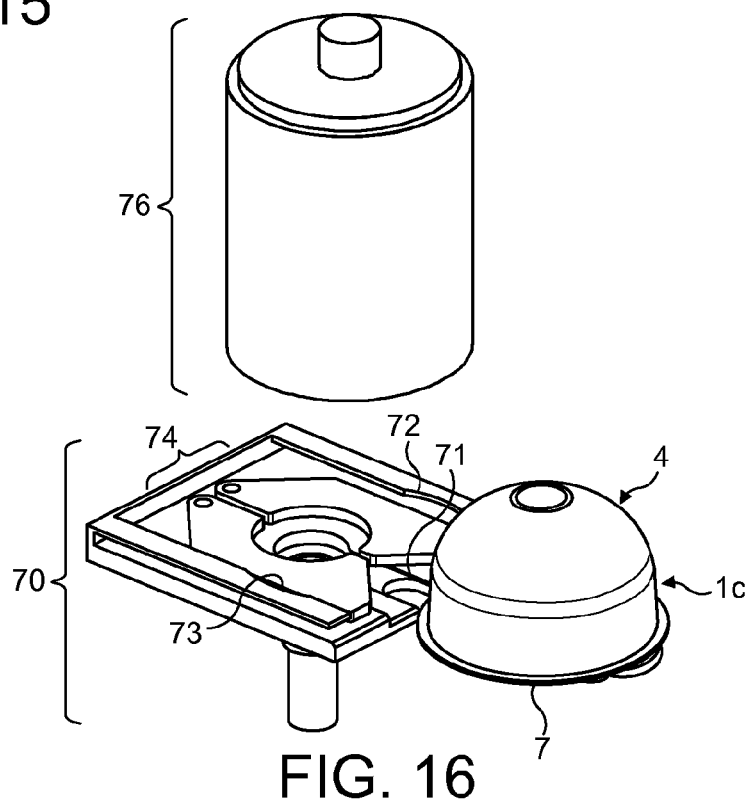
Figure 17:
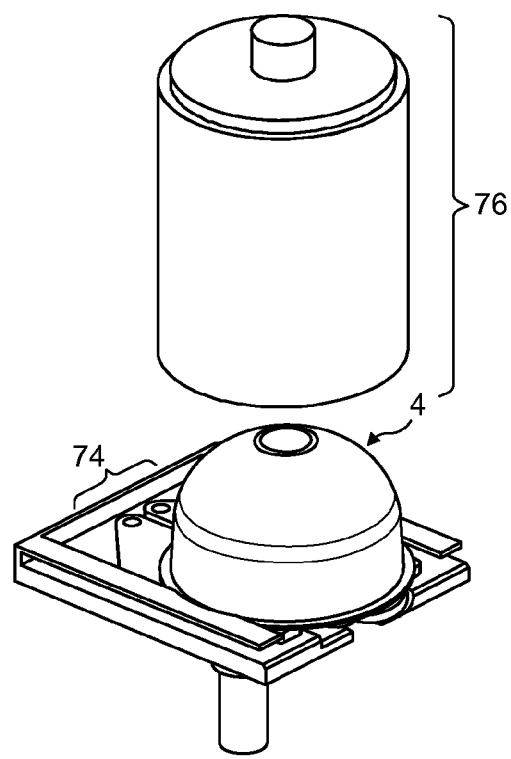
Figure 18:
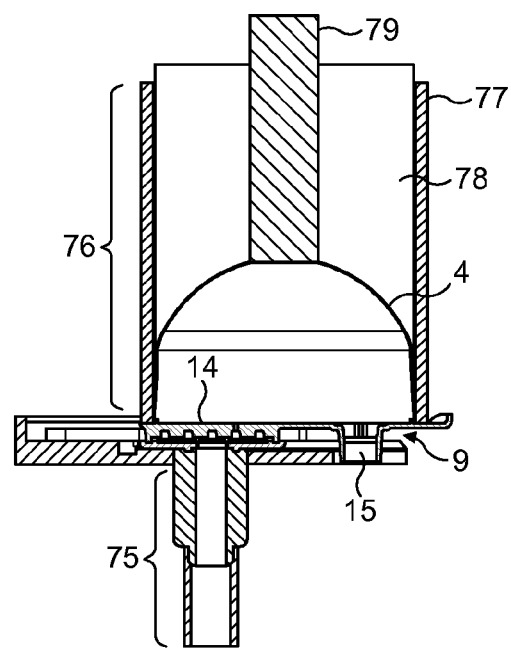
Figure 19:
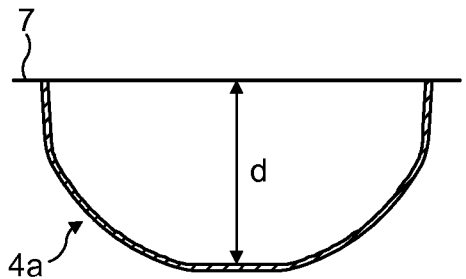
Figure 20:
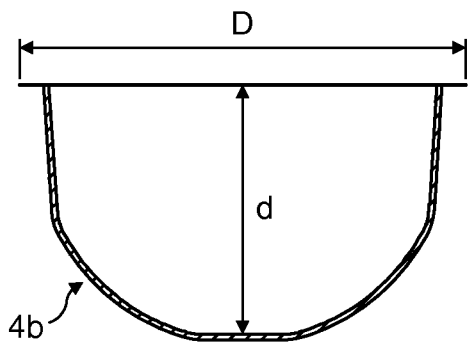
Figure 21:
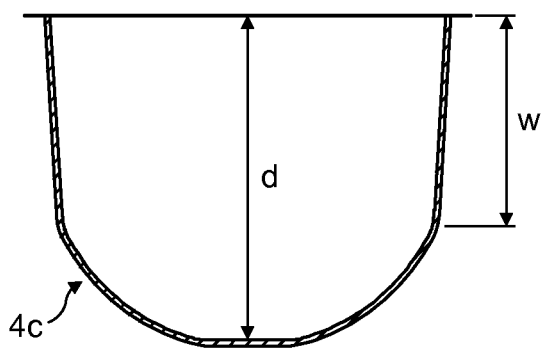
Figure 22:
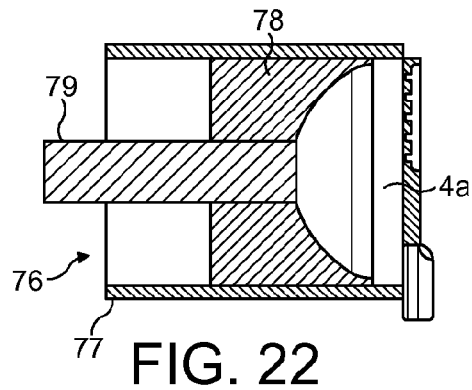
Figure 23:
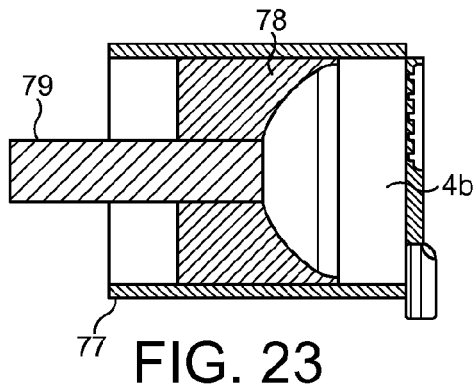
Figure 24:
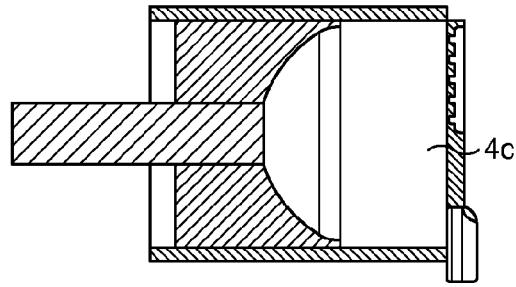
Figure 25:
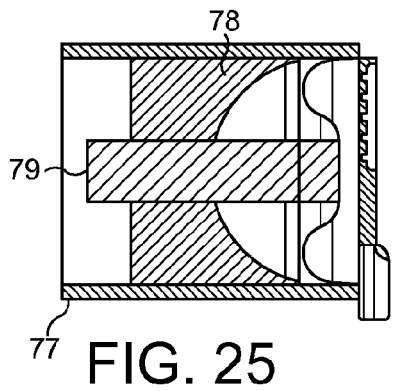

FIG. 1 shows a face view of a portioned capsule in a first mode of the system of the invention, FIG. 2 shows a cross-sectional view of the capsule of FIG. 1 along A-A, FIG. 3 shows a perspective and exploded view of the capsule of FIGS. 1 and 2, FIG. 4 shows a portioned system comprising a capsule of FIGS. 1 to 3 inserted in a liquid supply device with a collecting vessel placed below the capsule to collect the nutritional product, FIG. 5 shows a cross-sectional view along B-B of the capsule of FIG. 2 when placed in the device of FIG. 4, FIG. 6 shows a cross-sectional view along C-C of the capsule of FIG. 2 when engaged in the device, FIG. 7 shows a face view of a portioned capsule in a second mode of the invention, FIG. 8 shows a cross-sectional view of the capsule of FIG. 1 along A-A, FIG. 9 shows a perspective and exploded view of the capsule of FIGS. 7 and 8, FIG. 10 shows a cross-section and exploded view of a portioned system according to a third mode of the invention, FIG. 11 shows a cross-section view of the mode of FIG. 10 during operation, FIG. 12 shows a detail in cross-section of a variant of the capsule embodiment of FIGS. 1 to 3, FIG. 13 shows a face view of a portioned capsule according to a fourth possible mode of the capsule of the invention, FIG. 14 shows a cross-sectional view of the capsule of FIG. 13 along A-A, FIG. 15 shows a perspective and exploded view of the capsule of FIGS. 13 and 14, FIG. 16 shows a perspective view of the system using a capsule according to FIGS. 13 to 15 before engagement of the capsule, FIG. 17 shows a perspective view of the system of FIG. 16, when the capsule is engaged in the system, FIG. 18 shows a cross-sectional view of the system of FIGS. 16 and 17, FIGS. 19 to 21 illustrate a series of containers of the system for different sizes, FIGS. 22 to 24 illustrate the adaptation of the capsules comprising the different containers of FIGS. 19 to 21 when associated to the compressing means of liquid supply device, FIG. 25 illustrates the operation of compression of the container of any one of the capsules of FIGS. 22 to 24 in the compressing means of the liquid supply device.

FIGS. 1 to 3 present a first embodiment of a single-use capsule 1A according to the invention. The capsule 1 is part of a portioned system which comprises a liquid supply device 2 for receiving the capsule, as illustrated in FIGS. 4 to 6.

A vessel 3 which is not necessary a part of the portioned system is also necessary to collect the liquid nutritional product as illustrated in FIGS. 4 to 6. The vessel can be any suitable product collecting receptacle such as a baby bottle or a glass or cup.

Back to FIGS. 1 to 3, the capsule of the invention comprises a single-use container 4 such as a cup comprising a bottom 5, a sidewall 6, a flange-like rim 7 delimiting a large opening 8. The container may be of plastic, or aluminium or a biodegradable material, such as PLA, cellulose or starch, or combinations thereof. The container has a sufficient capacity to receive a dose of ingredients, e.g., an infant milk-based composition, of several grams. The ingredients can be powder, a gel or a liquid concentrate. The container may be of various sizes depending on the desired dose to be delivered. In particular, the dose of ingredients may vary as a function of the age of the infant or toddler as described in WO2006/077259.

The capsule 1 further comprises a single-use liquid injection interface 9 which closes the container. The interface 9 comprises a transversal wall 10, e.g., made of rigid plastic, that is large enough to cover the opening 8 and is sealed onto the flange-like rim 7. The liquid injection interface is designed to ensure the entry of liquid in the container for mixing with the ingredients and the delivery of the resulting mixture, i.e., the liquid nutritional product, for the capsule. The supplied liquid as used for the preparation of the product is preferably ambient or warm water. The liquid injection interface 9 may further assure filtering of the liquid to remove certain micro-contaminants such as unwanted micro-organisms (e.g., bacteria, yeast, mould, virus, etc.).

More particularly, the liquid injection interface 9 comprises a liquid inlet 11 providing liquid communication through the transversal wall 10. The liquid inlet can comprise at least one through-hole formed through said wall 10. The inlet also comprises an antimicrobial filter 12 for filtering liquid against micro-contaminants as aforementioned. The filter is sealingly placed across the liquid flow path entering the inlet of the liquid injection interface for purifying liquid before it mixes with the ingredients. The filter can present a nominal pore size of 1 μm or less, more preferred 0.5 μm or even less. The antimicrobial filter can comprise a microporous polymer membrane. The material for the membrane can be chosen from the list of: PES (polyethersulphone), cellulose acetate, cellulose nitrate, polyamide and combinations thereof.

The filter is placed in a supporting seat 13 of the transversal wall and it is maintained in sealing engagement at its edge by a protective cover 14. In the bottom of the seat 13 is provided an injection through-orifice traversing the wall 10 (through-orifice 130 only visible in the embodiment of FIG. 14). The orifice is preferably of small diameter to promote a high velocity of the liquid in the container. The diameter of the orifice may be for instance comprised between 0.2 and 1.0 mm, preferably between 0.5 and 0.8 mm. The liquid velocity is preferably comprised between 5 to 30 m/s. The seat 13 preferably comprises a multitude of supporting discrete edges 131 protruding from the bottom of the seat 13, e.g., studs, small ridges, etc. These edges act to limit the deflection of the filter when it is submitted to the pressure of liquid and therefore prevent the filter 12 from breaking. The edge of the filter can be simply pinched between, or can be additionally, or alternatively sealed to both the seat and cover, e.g., by ultrasonic sealing. The cover is such that it comprises a local inlet port 15. Such port can be already open or, preferably, be air-closed before use. When it is air-closed, as illustrated in FIG. 1, it can be opened by mechanical or fluid pressure. For instance, the inlet port 15 is closed by a breakable plastic cap or by a perforable or peelable membrane. It should be noted that the inlet port 15 and the liquid outlet of the distributor 28 can be of much smaller diameter, preferably at least two times smaller, than the overall surface of the filter 12. For example, the filter diameter is of about 25 mm while the diameter of the wall 10 is of about 62 mm.

The same interface 9 further comprises a product outlet 16 that is formed through the transversal wall 10. The construction of the capsule is designed to reduce the number of pieces and to facilitate the assembly during manufacturing. Thereby, the product outlet 16 comprises, in the first mode, a filtering membrane 17, through-passages 18 in the wall, and a duct 19 formed by the assembly of the wall 10 and cover 14. The filtering membrane 17 can be a perforable membrane, e.g., of aluminium or a thin polymer or can be a filter, e.g., a paper filter or a porous polymer. The filtering membrane ensures that the too large food particles are not able to pass directly through the outlet. When the membrane 17 is perforable, it can be perforated against at least one pointer 20 protruding from a cavity or set 21 formed at the inner surface of the wall (FIG. 12 for detail). Filtering of the liquid product is thereby obtained by the interstices created between the perforations of the membrane and the pointer(s). The pointer 20 can have various shapes such as the shape of a truncated pyramid (FIG. 12) or a cross. The bottom of the cavity comprises a series of through-holes 18 for allowing the flow of product to traverse the wall and which communicates within the duct 19. The through-holes are preferably placed as close as possible to the rim 7 in order to promote product evacuation when the container is vertically oriented in the device. Preferably, the through-holes are distant from the inner edge of rim 7 of a distance of about 5 mm or less. The number of through-holes and their diameter can vary. For example, four holes can be provided of 2-mm diameter each. The duct 19 is formed by two-half tubes of, respectively, the wall and cover. The duct 19 is oriented substantially parallel to the plane passing by the transversal wall such that the flow of product when leaving the container is guided downwards in the direction of a vessel placed underneath.

As illustrated in FIGS. 4 to 6, the capsule 1 is suitable for insertion in a liquid supply device 2. For example, the capsule can be inserted through a compartment 22 provided in the device which is apparent after opening, e.g., of a hinged door 23. The capsule is then maintained in place in the device by jaw means or a similar capsule holding mechanism (not shown). The capsule is positioned in such a way that its duct 19 is materially placed above and central relative to the collecting zone 24 for the vessel 3 (FIG. 5). As shown in FIG. 6, the device comprises a liquid supply means, e.g., a water reservoir 25, a liquid pump 26 for transporting liquid to a liquid heater 27 and finally via the liquid distributor 28 of the device to the injection interface 9. The liquid distributor is arranged to fit with the liquid interface 9 in a fluid-tight manner. The liquid distributor may comprise a piston 29 which moves relative to the capsule for pressing against the liquid interface 9 during closure of the device. The device may further comprise a source of compressed air 30, e.g., a compressive air pump, for delivering compressed air in the capsule after the operation of supply of the liquid in order to assist the emptying of the capsule. The selection of liquid or air can be carried out by means of a valve 31, e.g., a three-way valve, as illustrated or can also be formed of an independent fluid line connectable to the capsule and selectively openable by a separate one-way valve. The liquid tightness can be assured between the liquid distributor and the liquid interface 9 via a sealing means such as a rubber-elastic element interposed between the piston 29 and the inlet of the interface.

FIG. 5 illustrates a possible recognition of the capsule when inserted in the liquid supply device in order to ensure that at least certain liquid supply parameters are correctly set depending on the type of capsule inserted in the device. Regarding capsules containing nutritional ingredients, it can be important to set up certain parameters automatically in order to assist the users (e.g., the mothers) to easily and safely prepare the final nutritional product. In particular, the temperature of liquid and/or the volume of liquid can be automatically controlled as a result of the recognized capsules. Other parameters such as the volume of compressed air as a function of the container's capacity can also be controlled to ensure a complete emptying of the capsule. For this, the interface further comprises recognition means 33 such as a predetermined combinations of mechanical indentations (e.g., one, two or three) capable of selectively activating a corresponding number of electro-mechanical switches 34 of the device to produce binary codes (e.g., 001, 010, 100, etc.) detected by the control unit of the device. This principle of the capsule recognition is known per se and thereby does not need to be further detailed. Of course, other capsule recognition means can be used such as barcodes, magnetic strips or radio-frequency tags.

It should be noted that after preparation of the nutritional product from the capsule, the container 4 can be compressed, either manually or by compressing means, so that the used capsule takes a smaller volume for waste. Compression of the container can be carried out by applying a force at the bottom 5 of the container towards the injection interface. The container 4 can be designed with a geometry that promotes the compressibility in the preferred direction. Also, the flat bottom 4 of the container provides a stable support for applying the compressive forces.

A second mode of the capsule is illustrated in FIGS. 7 to 9. In this mode, the main difference for capsule 1B compared to the preceding mode lies in the different arrangement of the product outlet 16. In particular, the filtering membrane 17 is now housed in a seat 35 formed on the outer surface of the transversal wall 10. Therefore, the perforating means, e.g., a pointer 20 protrudes from the inner surface of the cover 14, in particular, at the beginning of the portion of duct 19. Due to the insertion of the membrane 17 between the wall 10 and the cover 14, the membrane is better secured and protected, in particular, during handling of the liquid injection interface for the manufacturing the capsule. The membrane 17 can also be a filter wall providing a relatively low pressure loss so that the capsule can more easily be emptied by gravity or under a low pressure of air.

In both previous embodiments, the interface 9 can be separated from the container by breaking the connection at the sealing edge 7 between the interface and the container. The liquid injection interface can be separated when the user wishes to prepare the product manually or after use for recyclability purposes. For assisting separation, the interface 9 may further comprise a laterally protruding tab 36. The tab 36 can be pulled outwardly in a direction perpendicular to the wall 10 to cause the breakage of the seal at the edge 7 and thus the separation of the interface from the container.

Another mode of the portioned system of the invention is illustrated in FIGS. 10 and 11. In this mode, the liquid injection interface 37 is thought as an element which is separate from the container 38 itself. The container comprises a cup 39 and a membrane 40 sealed onto the edge 7 of the container. The liquid injection interface 37 can be a disc-shaped member of about the size of the membrane 40 or slightly larger and thereby forming the transversal wall 10 engageable against the container, i.e., against membrane 40, during operation. The liquid injection interface is separable from the liquid injection device 41. The interface can be put in place in the device, e.g., such as in housing 42 before the insertion of the container in the device. The interface can be connected to the device by any suitable connection means such as by a sliding engagement (e.g., as a drawer), by press-fitting or threading (not shown). Sealing means such as an O-ring 43 ensures liquid tightness between the inlet surface of the interface 37 and the liquid supply conduit 44 of the device. As in the previous embodiment, the interface preferably comprises an antimicrobial filter 45 inserted within the flow path of the liquid inlet. The liquid inlet 43 further comprises at least one perforating member 46, e.g., a needle or blade protruding from an outlet surface 47 of the interface. The liquid inlet can be designed to provide a high velocity jet of liquid in the container. For this, the inlet can form a nozzle of reduced section in direction of the outlet surface 47.

The liquid injection interface further comprises a product outlet 48 positioned transversally at a distance from the inlet 43 and below the inlet 43 when the interface is vertically oriented as illustrated in FIG. 10. On the second surface 47 of the interface, the outlet extends by at least one perforating member 50 for perforating outlet(s) in the membrane 40 of the container. As in the previous embodiments, the outlet 48 also comprises a portion of duct 49 which runs substantially parallel to the direction of extension of the interface. The duct 49 communicates with a portion of conduit that opens on the outlet surface 47 of the interface, preferably through the perforating member 50.

FIG. 11 shows the system of FIG. 10 during the preparation of the nutritional product. The container 38 is moved relative to the liquid injection interface 37 thereby resulting in the membrane 40 of the container becoming perforated in the region corresponding to the liquid inlet 43 and product outlet 48. Liquid can thus be injected in the container via the interface 37 and mix with the ingredients in the container. The resulting mixture can drain through the product outlet without significant pressure increase in the container. Due to the low position of the outlet relative to the opening, the container can empty with little residue left in the container. Preferably, after injection of liquid in the container, air is allowed to enter in the container 38 to ensure that the capsule can correctly empty from the food liquid. Air can enter by at least partially disengaging the interface 37 from the membrane 40 thereby leaving a sufficient passage for air through the perforation(s) of the membrane 40. Air can also be allowed to enter the capsule by providing a separate air passage through the container, e.g., by perforating a distinct hole in the membrane 40. For instance, the interface can be traversed by a perforator of the device for perforating the membrane 40 after the operation of supplying liquid in the container. Instead of the membrane 40, the bottom or sidewall of the container 39 can be perforated for creating the air vent.

A following step for emptying the container by purging with compressed air is not necessary although it may also be envisaged as a possible solution if the flow resistance in the product outlet 37 or at the membrane 40 is too high.

The liquid injection interface 37 can be disposed after a single use when hygiene is critical such in the delivery of infant formula. In an alternative, the interface is disposed after a limited number of uses or after a certain period of use. It may be that the system is disabled automatically until the used interface has been exchanged by a new interface. For this, the interface can be provided with a barcode or an electronic or RFID tag that communicates information with the device. The device will control the number of use or the period of use of the interface in the device.

In FIG. 12, it is shown a variant of the capsule of FIGS. 7 to 9 in which the dispensing duct 19 of the product outlet can be formed integrally in the transversal wall 10 of the interface.

In another economical variant (not shown), the cover 14 could be overmoulded on the membrane or filter 17 as the two elements are conjoined. A filter-cover assembly can be formed that is then directly sealed onto the transversal wall.

FIGS. 13 to 14 illustrate another variant of a capsule 1C of the invention but which is intended to be oriented in the liquid supply device with the injection interface 9 lying along a horizontal plane $P_2$ as depicted in FIG. 14. The capsule comprises a container 4 which is closed by the interface 9 which is sealed onto the edge 7 of the container. The injection interface also comprises a main transversal wall 10 lying along said plane $P_2$ when in operation in the device as will be described later. The wall 10 comprises a receiving seat 13 for supporting an antimicrobial filter 12. As in the previous embodiments of capsules 1A, 1B, a protective cover 14 overlies the filter 12 and seals the filter at its periphery in its seat 13. The cover comprises an inlet port 15 which can be open or, alternatively, closed by a cap or a puncturable or removable membrane. The main difference compared to the other embodiments comes from the product outlet which comprises a duct 19 forming a tubular portion which protrudes perpendicularly from the transversal wall 10. As a result, when liquid product is delivered from the capsule, it is guided downwards directly in the vessel positioned right under the duct 19. The product outlet 16 also comprises a perforable membrane or a filter 17 which is also positioned in a seat at the internal surface of the transversal wall 10. A protruding member can be lodged in the seat to break the membrane under the pressure of liquid building in the container. Finally, the bottom of the seat has throughholes 18 between the membrane or filter 17 and duct 19.

The capsule 1C of FIGS. 13 to 15 can be inserted in a liquid supply device for which the capsule handling assembly is represented on FIGS. 16 to 18. The device comprises a capsule holder 70 onto which the capsule 1C can be associated such as by sliding along guiding means. The guiding means comprise a series of lateral flanges 72, 73 which guide the edge 7 of the capsule. The guiding means may further comprise a central rail 71 providing a throughpassage for the duct 19 of the capsule. Furthermore, a locking means 74 is provided to lock the capsule in place and secure its position on the capsule holder. The locking means 74 can be formed as a pair of jaws which secures the interface, and more precisely the cover 14 of the capsule in a resilient manner. The jaws can be mounted resiliently under the effect of an elastic means, e.g., a spring (not shown), to oppose a resilient force to the cover during insertion of the capsule and thereby maintaining the closure force around the cover in the position of insertion of the capsule. Due to the position of the liquid inlet on the same side of the capsule at the interface 9, the capsule holder further comprises a liquid distributor 75 which engages the cover in a fluid impervious manner.

The device further comprises a compressing assembly 76 which engages the container outside the injection interface. The compressing assembly 76 is formed of a fixed hollow part 77 into which is lodged an adjusting shell 78 capable of moving in the hollow part 77 to adjust to the containers depth. The assembly further comprises a compressing piston 79 adapted to move relatively to the shell 78 from a rest position illustrated in FIG. 18 to a position of compression of the container illustrated in FIG. 25. In the compression state, the container can be sufficiently crushed against the interface 37 and liquid distributor (not shown). The piston can also be further moved forwards to eject the container (e.g., the whole capsule including its interface) out of the compressing means 76. The compressed container can thus be collected into a bin or outside the device.

Therefore, the assembly 76 is designed to be able to engage containers of different sizes as illustrated in FIGS. 22 to 24.

Furthermore, containers of different sizes can be proposed to adjust to the age of the infant or toddler to be fed. Therefore, the present system offers a greater flexibility for proposing a series of capsules adapted to the age of the person to be fed by varying the size of the container while keeping the same injection interface.

FIGS. 19 to 21 illustrate a possible variation of the size of the containers with their liquid injection interface removed (for simplification of the drawings). The containers 4a, 4b, 4c have all the same diameter "D" as measured at their sealing edge 7 but a depth "d" that varies in the series. The increase in size of the containers can be obtained by increasing the width "w" of the sidewall of the container in the series. As a result of the constant diameter D in the series of containers 4a-4c, a single liquid injection interface can adapt to the different containers. The number of packaging elements can be greatly reduced for manufacturing an agetailored feeding capsule system.

FIGS. 22 to 24 illustrate the possible adaptation of a series of capsules having different containers 4a-4c, associated with a common liquid injection interface, in the compressing device 76 which is adapted to reduce the size of the containers. The compressing device 76 can be part of the liquid supply device as in the embodiment of FIGS. 16 to 18 or, alternatively, it can also be a separate device. In order to promote the compressibility of the capsules from the bottom towards the interface, the containers 4a-4c have more flexible walls than the transversal wall of liquid injection interface. The increased flexibility can be achieved by thinner walls and/or more flexible packaging materials. Preferably, the walls of the container are at least 2 times thinner than the transversal wall of the interface (when thickness is measured on the wall outside the liquid inlet and product outlets). Furthermore, the relatively flat bottom wall of the container is more rigid than the sidewall to also promote collapsing of the sidewall compared to the bottom wall.

The invention claimed is:

1. A portioned system for preparing a nutritional liquid product, the portioned system comprising:
    a liquid supply device;
    a container containing nutritional ingredients, the container having an opening; and
    a liquid injection interface for supplying a liquid in the container to provide the nutritional liquid product by mixing the liquid with the nutritional ingredients in the container, the liquid injection interface comprising a liquid inlet and a product outlet for removing the nutritional liquid product from the container,
    the liquid injection interface further comprises a wall that is sealed onto a flange-like rim of the container in a fixed manner to form a single-use capsule, and the wall extends transversally relative to the opening of the container, the wall comprising the liquid inlet and the product outlet which are transversally distant to one another along the wall,
    the liquid injection interface further comprises a product dispensing duct substantially parallel or perpendicular to the wall, the product dispensing duct is formed by the wall and a cover connected to the wall, and wherein the liquid injection interface is positioned in the liquid supply device when engaged with the container during operation.

2. The portioned system of claim 1, wherein the liquid injection interface is positioned vertically in the liquid supply device when engaged with the container during operation so that the product outlet is placed on the liquid injection interface at a distance below the liquid inlet during product dispensing.

3. The portioned system of claim 2, wherein the product outlet is located in front of the opening and adjacent the flange-like rim of the container.

4. The portioned system of claim 1, wherein the liquid injection interface is located horizontally in the liquid supply device when engaged with the container during operation and below the container so that the product outlet is placed laterally distant from the liquid inlet.

5. The portioned system of claim 1, wherein the liquid injection interface further comprises an antimicrobial filter.

6. The portioned system of claim 5, wherein the liquid injection interface further comprises a filter-supporting structure formed by several studs or ridges protruding from a recessed seat onto which the antimicrobial filter is placed.

7. The portioned system of claim 5, wherein the antimicrobial filter is covered by the cover.

8. The portioned system of claim 1, wherein the liquid injection interface has at least one inlet perforation member for opening at least one liquid orifice in the container when engaged with the container and at least one outlet perforation member for opening at least one product dispensing orifice in the container when engaged with the container.

9. The portioned system of claim 8, wherein the container has a perforable membrane which closes the opening of the container and which is perforated by the liquid injection interface when the liquid injection interface engages the container.

10. The portioned system of claim 1, wherein the liquid injection interface is a separable and disposable part placed between the container and the liquid supply device.

11. A capsule for preparing a nutritional liquid product from nutritional ingredients, the capsule comprising:
    a container having an opening; and
    a liquid injection interface for supplying a liquid in the container to provide the nutritional liquid product, the liquid injection interface comprising a liquid inlet and a product outlet for removing the nutritional liquid product from the container,
    the liquid injection interface comprises a transversal wall that is sealed onto a flange-like rim of the container for closing the opening of the container, the transversal wall comprising the liquid inlet and the product outlet which are transversally distant to one another along the transversal wall,
    the liquid injection interface is connected to the container in a fixed manner to form a single-use capsule, and
    the liquid injection interface further comprises a product dispensing duct substantially parallel or perpendicular to the transversal wall, the product dispensing duct is formed by the wall and a cover connected to the wall.

12. The portioned system of claim 1, wherein the liquid injection interface further comprises an antimicrobial filter, and the antimicrobial filter is positioned between the wall and the cover.

13. The portioned system of claim 1, wherein the product dispensing duct is substantially parallel to the wall.

* * * * *